Aug. 6, 1968  B. J. MIDLOCK ETAL  3,396,366
ULTRASONIC WAVE DIRECTIVE ASSEMBLY
Filed May 18, 1965  4 Sheets-Sheet 1

INVENTORS
RICHARD CARLISLE
BERNARD J. MIDLOCK
BY Edward F. Lawes
ATTORNEY

Aug. 6, 1968  B. J. MIDLOCK ET AL  3,396,366

ULTRASONIC WAVE DIRECTIVE ASSEMBLY

Filed May 18, 1965  4 Sheets-Sheet 2

INVENTORS
RICHARD CARLISLE
BERNARD J. MIDLOCK
BY Edward H. Evans
ATTORNEY

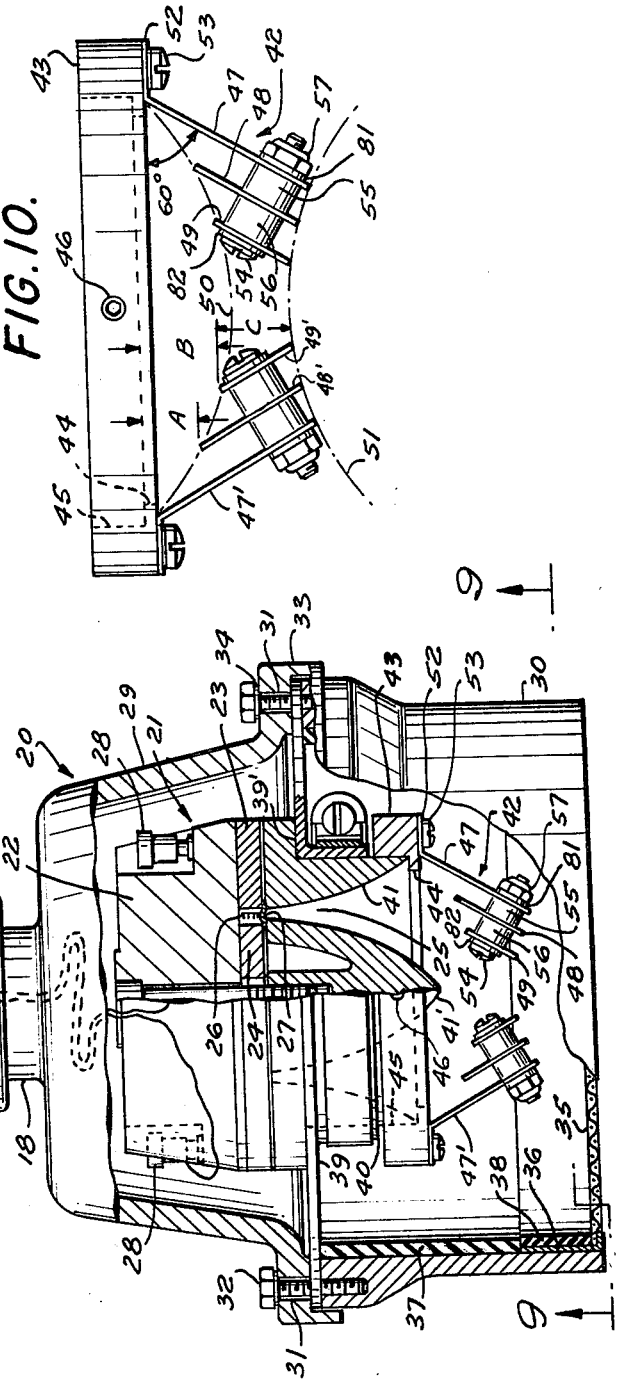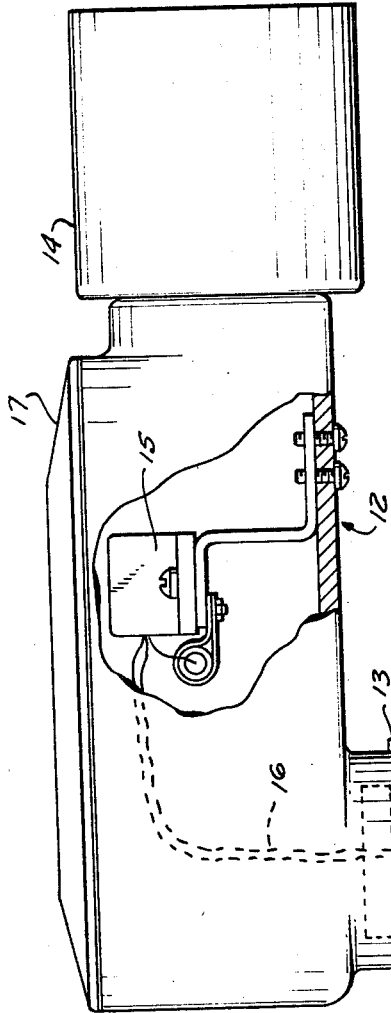

FIG.11.
FIG.12.
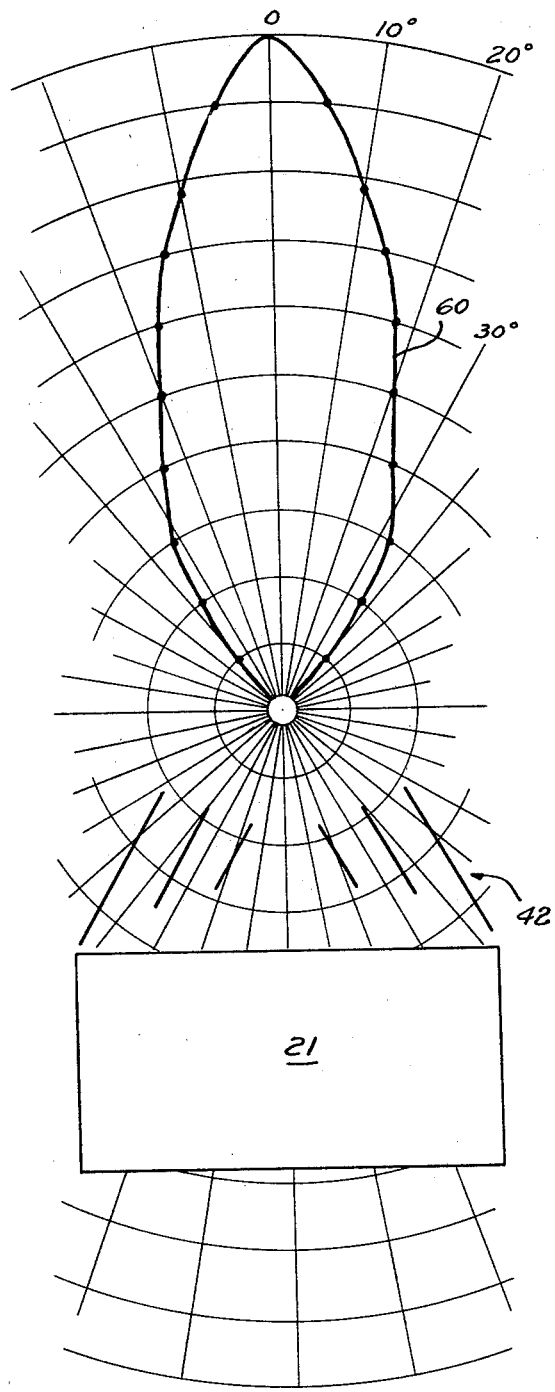
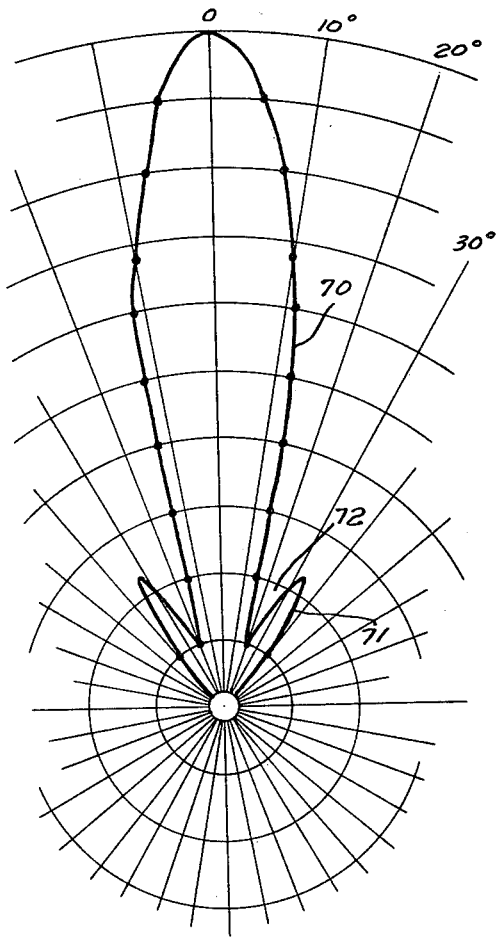
INVENTORS
RICHARD CARLISLE
BERNARD J. MIDLOCK
BY Edward H. Cames
ATTORNEY United States Patent Office 3,396,366
Patented Aug. 6, 1968

3,396,366
ULTRASONIC WAVE DIRECTIVE ASSEMBLY
Bernard J. Midlock, Norwalk, Conn., and Richard W. Carlisle, Greenburgh, N.Y., assignors to Laboratory for Electronics, Inc., Waltham, Mass., a corporation of Delaware
Filed May 18, 1965, Ser. No. 456,630
16 Claims. (Cl. 340—38)

ABSTRACT OF THE DISCLOSURE

An improved sonic or acoustic wave directive assembly, an electroacoustic or sonic transducer head assembly and/or sonic detector of vehicles incorporating an improved sonic wave directive assembly. An improved preferred form of wave directive assembly includes a pair of spaced lens segments or wave directive sets of several elongated slanted vanes, the two sets being mounted symmetrically with respect to the wave transmission axis. The vanes of each set are slanted outward from the front of the assembly toward such transmission axis, and are spaced in parallel planes within the set, the outermost vane serving to mount the set and the successive vanes having progressively varying width and lateral displacement within the set so that the outer and inner edges of the vanes lie along respective substantially cylindrical surfaces having axes perpendicular to the transmission axis, such axes being behind the assembly for the inner edges and ahead of the assembly for the outer edges, to provide a substantially cylindrical biconcave, lens-like assembly, adapted to be mounted with a transducer over or adjacent a road with such cylindrical axes along the road to provide a wide beam pattern (with minimal side lobes) transverse to the road (e.g., for two lanes) and a narrow beam pattern along the road.

---

The following invention relates, in general, to a sonic detector capable of detecting vehicles passing through a defined zone, but more specifically, is directed to an improved sonic or acoustic lens and transducer assembly and to an improved sonic or acoustic lens or wave directive assembly for use within an electrosonic or electroacoustic transducer head assembly. In a further aspect the invention relates to a sonic head assembly for directive transmission and reception of sonic waves in a detection system for vehicles in road traffic.

Throughout the course of this description, reference may be had to a detector which may comprise an electrical circuit to provide electrical energy, together with a transducer to change the electrical energy to sound energy, a lens and a mounting head for the two latter elements; but, as noted above, the invention is primarily directed to that part of the assembly exclusive of the particular electrical circuitry. Therefore, unless otherwise noted, the term "detector" is deemed to refer to a sonic head assembly which mounts the transducer and lens. Also, reference herein to sonic levels is deemed to refer to ultra sonic frequency levels, such as those levels near or above 19 kc. (kc. representing kilocycles per second), which are above or substantially above what can be considered as the normal audible hearing range.

Detectors which may be mounted either above a lane of traffic to direct sonic waves vertically downward or at the side of the road and elevated therefrom for "sidefire" operation, directing sonic waves obliquely downward across part of the road, are now in use, but with varying success. It has been found that such prior detectors do not provide optimum results in the environment of vehicle detection as will now be brought out. Detectors now in use, although capable of directing sonic waves toward a defined zone to be monitored and thereby detecting vehicular traffic within this zone, provide a relatively narrow usable beam pattern of such waves so that only a small zone, as for example, a single lane of traffic, may be monitored properly.

The total beam pattern produced by sonic transducers of the type illustrated and in use in prior detectors, is represented by an internal or central beam area of maximum or high energy and an outer area defined by side lobes of substantially reduced energy level. Between these areas is a null or area of negligible energy which is incapable of reliable vehicle detection. With such prior detectors, the area of the null reduces the total information obtainable by essentially "blacking out" portions within the total zone and therefore greatly limiting the effective total zone for detection to the narrow central beam area.

Although the need for broadening the sonic wave beam transverse to the road has been a problem in the prior art, this is complicated by the fact that a narrow beam width is needed along the road or path of traffic to enable detection separately of two successive closely spaced vehicles. Thus if the beam were to be widened in all directions to provide the greater transverse width for detection in adjacent traffic lanes, the increased width along the lane would increase the probability of the rear of the first vehicle and the front of the second vehicle of two successive vehicles being in the beam concurrently, so that the detector could not recognize the space or gap between successive vehicles so as to detect them separately.

The lens or wave directive assembly of the present invention has a special directive form to solve these problems by providing a wide beam across the road while retaining a narrow beam along the road, as more fully described below.

Additionally, all known forms of detectors now in use, employ separate units for transmission and for reception of sonic waves, necessitating the use of matched equipment and larger, heavier and more costly assemblies than in detectors employing the present invention.

To overcome the undesirable features or problems mentioned above, the instant invention provides a lens or wave directive assembly or a lens and transducer head assembly which will accurately and dependably detect bodies, such as motor vehicles, within an enlarged zone which comprises multiple traffic lanes. The wave directive assembly of this invention not only retains the highly directional capability of known detectors along the road, but further provides a wider beam pattern which can extend transverse to the roadway across at least two lanes of traffic in one direction.

The beam pattern across the road or transverse to the traffic flow will also be one having minimal or no side lobes and associated null areas in the desired detection zone, so that with a smooth beam pattern the zone of detection may be adjusted by simple sensitivity adjustment of the associated circuitry, not shown but already known in the art as in U.S. Patent 3,182,311 of Bernard J. Midlock, issued May 4, 1965 for Low Frequency Responsive Vehicle Detector, for example.

As an additional advantage of this invention, only a single lens and transducer head assembly, which is compatible for both transmission and reception of sonic pulses, is employed, rather than the multiple units as in known detectors.

The invention is preferably to be used in a pulse-echo type detection system, although the invention is not limited thereto and may be used in continuous wave systems.

The lens-like assembly of two sets of vanes mounted symmetrically on opposite sides of the transmission axis of the sonic waves, slanted outward toward such axis, and mountable in front of the sonic transducer, is one aspect of a wave directive assembly according to the invention and is frequently referred to herein for convenience as a lens, although it is not intended that this term be limited to a lens since the assembly may have other wave directive action as discussed below.

It is an object of this invention to produce a highly directional sonic beam pattern of desired spread within a defined zone. To accomplish this object, the invention contemplates the use of a sonic lens together with a transducer and a support therefor.

It is a further object to provide a relatively wide beam pattern across or transverse to a roadway and a relatively narrow beam pattern along the roadway. This object is carried out in the preferred construction by the provision of a lens of substantially cylindrical biconcave configuration with spaced segments, which will affect portions of an emanating sonic beam and cause this portion to diverge outwardly in the desired directions from the normal relatively narrow beam pattern produced without the use of a lens.

A further object is to produce a beam pattern transverse to the roadway which has minimal or no side lobes.

It is yet a further object to provide a sonic lens for use with a single transducer head assembly for transmission and reception so as to eliminate the need of two transducers having substantially identical characteristics.

Other objects and advantages attained by the use of the lens and transducer head assembly of this invention will be apparent as the following description is developed.

Generally, this invention covers a sonic or acoustic lens or wave directive assembly and a transducer head assembly. The lens or wave directive assembly includes a pair of lens segments or wave directive subassemblies of several slanted vanes, such segments being of identical or symmetrical configuration and being separated from one another and equidistantly spaced from the longitudinal axis of the assembly to define an opening in the area of said longitudinal axis.

The lens segments are mounted in front of and to the side of the transducer, and in the sonic wave transmission path. The individual segments comprise a plurality of vanes in parallel spaced relation and slanted such that the planes of the individual vanes of one segment intersect with those of the corresponding vanes of the other segment, in front of the lens and along the plane of the longitudinal axis of the assembly and the central transmission axis perpendicular thereto. The corresponding side walls or edges of the several vanes along their longitudinal extent, lie substantially on the surface of a cylinder which may be described from an axis which intersects and is perpendicular to the transmission axis of the assembly. In the preferred construction the inner edges of the vanes lie substantially along the surface of a cylinder having a cylindrical axis well behind the front of the transducer, i.e., outside the wave directive assembly and on the same side as such inner edges, and the opposite or outer edges of the vanes lie substantially along the surface of another cylinder having a cylindrical axis well in front of the transducer and lens assembly, i.e., outside the wave directive assembly and on the same side of the wave directive assembly as the outer edges of the vanes. The resulting lens-like assembly is configured, in side elevation, as a bi-concave lens which functions to diverge a sonic beam passing therethrough.

The lens is conveniently mounted on the transducer so that the individual vanes lie in the path of the sonic beam and the transducer, in turn, is mounted within a housing or head assembly with the housing enclosing both the lens and transducer.

In the accompanying drawings, which both illustrate a preferred embodiment of our device and form a part of the application and in which like numerals are employed to designate like parts throughout the same.

FIGURE 8 is a side elevational view of the detector with a portion of the cover and mountings broken away to show the positioning of the lens in relation to a transducer and also the configuration of the transducer;

FIGURE 10 is an enlarged view in front elevation of the lens and its mounting structure;

FIGURE 11 is a polar diagram of a beam pattern that is directed across or transverse to a roadway by the lens of this invention; and FIGURE 12 is a polar diagram of a beam pattern developed without the use of the lens of this invention and also a beam pattern which is representative of a beam pattern directed along the roadway and developed by using the lens of this invention.

Figure 1:
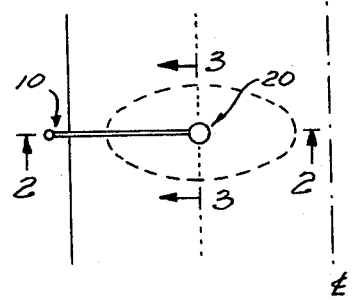
FIGURE 1 is a plan view of a beam pattern as developed on the roadway when the detector is mounted above the roadway and between two lanes of traffic.
Figure 2:
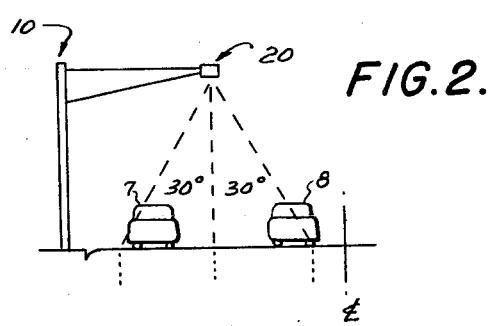
FIGURE 2 is a side view of the beam pattern as seen along the line 2—2 of FIGURE 1.
Figure 3:
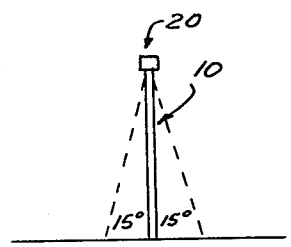
FIGURE 3 is a side view of the beam pattern as seen along the line 3—3 of FIGURE 1.
Figure 4:
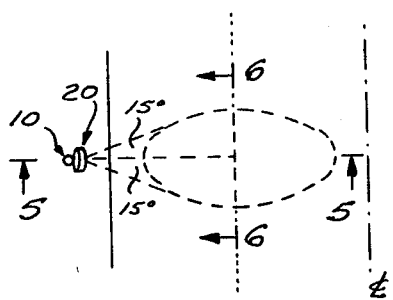
FIGURE 4 is a plan view of a beam pattern developed when the detector is mounted adjacent the roadway in a "side-fire" deployment.
Figure 5:
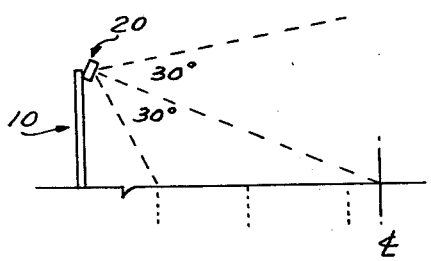
FIGURE 5 is a side view of the beam pattern as seen along the line 5—5 of FIGURE 4.
Figure 6:
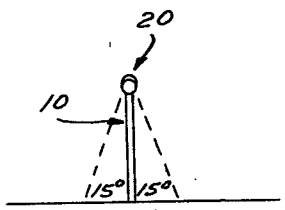
FIGURE 6 is a side view of the beam pattern as seen along the line 6—6 of FIGURE 4.

Referring now to the drawings and to FIGURES 1–7 in particular, the detector, generally indicated by the numeral 20, is shown in various mounted positions in relation to a roadway and specifically to roadways having both single and dual traffic lanes in one direction. In FIGURES 1–3, the detector is mounted above the roadway and centrally located with respect to a pair of parallel lanes. FIGURES 4–6 show the detector to be mounted adjacent the two parallel traffic lanes and elevated therefrom so as to direct a sonic beam downward toward the roadway in what may be considered "side-fire." In FIGURE 7, the detector is shown in relation to a roadway having a single traffic lane. It should also be pointed out the "side-fire" positioning of the detector is also appropriate in the monitoring of traffic in a single lane.

In FIG. 2, typical locations of vehicles 7 and 8 are shown schematically in the respective lanes, from which the significance of the invention will be apparent in eliminating a substantial null or undersired non-detection zone that would otherwise occur in the range of 15° to 25° within the 30° desired approximate maximum detection angle from the axis of the beam.

It has been found that sonic wave energy is reflected primarily by limited zones of the surface of a vehicle, such as along the side edge of the roof line or window ledge, or side edge of the hood or rear deck, for example, where the beam impinges at an angle.

Therefore, the positions of the vehicles in FIG. 2 illustrate conditions in which it would not be possible to get reliable detection of vehicles if nulls were present in the 15° to 25° angle range, which represents a large percentage of the width of the lanes.

As pointed more fully below and with particular reference to FIGURES 11 and 12 the present invention solves a serious problem in sonic detection by eliminating such nulls, which have been found to be prevalent in the beam pattern of transducers of the general type illustrated without the lens or directive baffle assembly in accordance with the invention.

The above positioning of the detector is merely exemplary for obviously other locations may be selected so that detection may be accomplished both across and along a roadway in the defined space or zone which is of interest. For the immediate purpose of this application, the particular positioning of the detector (as to its location above or adjacent to and elevated from the roadway) is not of primary concern, but as would be apparent, the wave directive assembly is particularly designed to have the vanes and the open space in their longitudinal direction parallel to the path of traffic along the road.

Pulse-echo systems are already known for responding to echoes from a reflecting object in a particular distance range from the pulse transmitter-receiver, based on the total time required for the pulse of transmitted waves to travel to the reflecting object and the echo or pulse of reflected waves to travel back to the transmitter-receiver, and the particular circuitry of the transmitter-receiver is not of concern here.

However, the present wave directive assembly is well adapted to pulse operation since it is rigid and is buffered by the mounting spacers so as to be well damped and substantially nonresonant for the ultrasonic waves.

Figure 7:
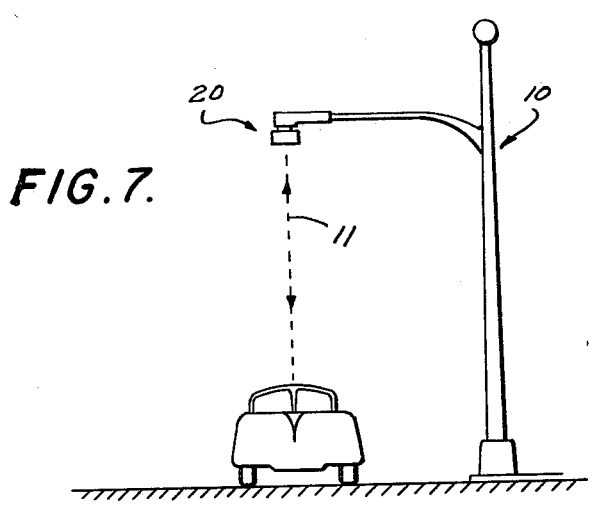
FIGURE 7 shows a representative deployment of the detector of this invention in relation to a roadway and a vehicle moving there-along with the transmitted and echo pulse directed away from and toward the single detector.

FIGURES 1–7 show the detector 20 supported for directional monitoring of a roadway in a conventional manner by means of a pole and extension arm, both indicated by the numeral 10. FIGURES 1–6 further show the various sonic beam patterns which are developed in a defined detection zone and show that the pattern is relatively wide across the roadway and relatively narrow along the roadway. FIGURE 7 illustrates the direct path of transmitted and received sonic waves, indicated by the numeral 11, emanating from and received by the single detector unit 20 shown in this figure in relation to a vehicle directly under the detector unit for example.

The detector 20 is shown in detail in FIGURE 8 and the detector is seen to be mechanically connected to a mounting portion, generally indicated by the numeral 12, which in turn is connected to the extension arm of pole 10. The mounting portion is of an L-shaped configuration and terminates at each end in a sleeve 13 and 14. Received within each sleeve, respectively, in telescoping relation, is a neck portion 18 of the detector housing and the extension arm of the pole, with the parts held in such assembled relationship by any suitable means as is well known in the art. As also may be seen in FIGURE 8, the transducer 21 is electrically connected to a terminal board 15 supported within the L-shaped mounting portion by means of the connecting wires 16. A cover 17 is removably fastened to the mount 12 to permit access to the terminal board.

The transducer 21, which is an integral part of the detector unit and used with the lens array to be described below, may be any one of many types of transducers, but in one preferred embodiment, may be in the form of a horn-loaded electro-acoustic transducer having a mouth diameter of approximately three inches and a generally exponential flare rate of approximately 130% to 210% cross-sectional area per quarter inch of axial length. It may have a generally annular horn shape, defined between an outer expanding member 41 and an inner contracting member 41'. The diaphragm 27 may have a generally annular shape. The radial distance from an outer or inner clamped edge of the diaphragm to the respective near edge of the throat of the horn may be of the order of one-quarter wave length at the upper end of the sonic frequency spectrum utilized.

As is well known, a transducer is a device which is activated by power from one system and supplies power to a second system. Herein, the transducer is activated by electric power in the form of electrical wave energy from the electrical energy source and transforms this electrical wave energy into usable ultrasonic wave energy in the air which is supplied and directed toward a lens assembly, to be described below. The transducer also serves to convert the sonic wave energy received via the lens assembly from the air into electrical wave energy.

A permanent magnet 22 forms the upper portion of the transducer and lies immediately above a pair of pole pieces 23 and 24 which are of a ring-shaped configuration and concentrically mounted with respect to one another. Between the pole pieces, above the annular horn portion 25, is an annular opening which contains an edge wound coil 26. Separating the horn portion from the annular opening is a ring-shaped metallic diaphragm 27 which is capable of vibration. It is by means of the permanent magnet, the pole pieces, coil and diaphragm that the electrical energy received at the terminals 28 is transformed into transmitted ultrasonic wave energy in air which is directed toward the lens by means of the annular horn 25, and also any corresponding ultrasonic wave energy received from the air is transformed into electrical wave energy available at terminals 28. The foregoing general operation is considered adequate since the particular construction and specific operation of the transducer does not form a part of this application.

The detector assembly as seen in FIGURE 8 is defined by an upper housing 29 and a lower housing 30. The upper housing is generally of a bell-shaped configuration, that is, the top wall is substantially closed and the side walls generally extend from the top wall in both a downward and outward direction. The side walls terminate to form a flat annular portion located radially outward from the top with the annular portion being in a plane generally parallel to the plane of the top wall. At a plurality of angularly spaced locations in the annular portion a plurality of holes 31 are drilled.

The lower housing is substantially of a cylindrical shape and is open at both ends. The cylinder walls are shown to be thicker at the top of lower housing and through this portion a plurality of angularly spaced holes are formed so that these holes are in alignment with the holes in the annular ring of the upper housing 29. Therefore, the two housing portions may be releasable secured together by screws 32.

From the peripheral edge of the annular portion a depending flange 33 is formed with the flange being in circumjacent relation to the bottom housing when the housings are assembled. As would be apparent, this flanged portion aids in the alignment of the housings when being assembled and further functions to partially prevent dirt or other matter from entering the assembly at such connection.

To maintain a tight connection between the housings 29 and 30, shakeproof washers 34 may be mounted intermediate the head of screws 32 and the annular surface.

A screen 35 is mounted in a frame 36 that may be frictionally received within the lower housing to substantially define a chamber therein. The mesh of the screen should be of such size that any water or moisture which may gather within the housing will readily pass through the screen in the form of droplets having little surface adhesion with the mesh. Further, the mesh should be of such size to prevent bugs or other foreign matter from entering the lower housing.

The screen may be fastened to the frame in any convenient manner and it should be pointed out that although the screen may slightly attenuate the sonic beam as it passes therethrough, it does not function or exhibit the qualities of a lens. Therefore, the screen will not diverge or converge the sonic beam from that direction as determined by the particular lens mounted within the lower housing 30. The screen is similarly ineffective with regard to received pulses.

Being that the housing portions 29 and 30 are formed of a low porosity substance, such as metal which is highly reflective and therefore, displays reflective capabilities, it has been found that there is a need to provide a liner within the lower housing and suitably along the longitudinal extent and in circumjacent relation with the inner cylindrical wall, to eliminate or at least substantially reduce internal sonic reflections within the lower housing occasioned by strong, received pulses. Therefore, liner portions 37 and 38, formed of sponge rubber, a high porosity plastic, or other high porosity substance, are received in the lower housing with the result the strong received pulses directed toward the walls of the lower housing are "absorbed" in the liner so as to be substantially dampened, thereby eliminating any internal reflections. The liner portion 37 may be mounted on the internal wall of housing 30 in any suitable manner, and as seen in FIGURE 8, liner portion 38 is mounted directly on the frame 36.

Mounting member 39, having a plurality of angularly spaced holes in its peripheral portion and in angular alignment with the holes in the housing members 29 and 30, is received between the members when the latter are fastened together. Generally, the mounting member is of a plate-shaped configuration and of a diameter which is slightly less than the internal diameter of flange 33 of the upper housing portion. The center of the mounting member is extruded with the end 40 of the extruded portion longitudinally removed from the plane of the mounting member. The outer cylindrical surface of horn body 41 of the transducer 21 is received within the extruded portion of 39 and the transducer is supported on the mounting member 39.

Figure 9:
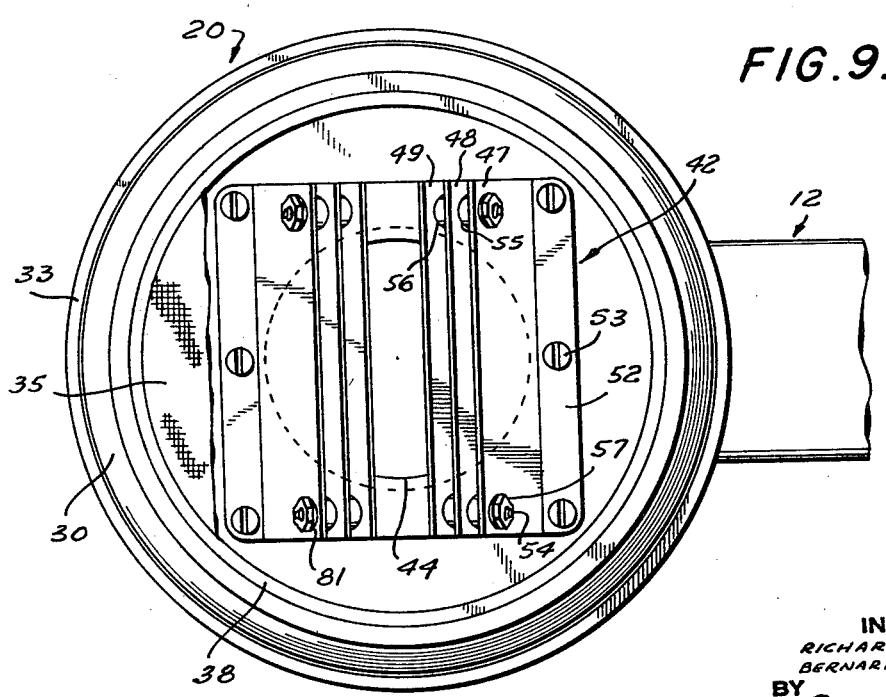
FIGURE 9 is a bottom view of the lens and assembly cover as seen along the lines 9—9 of FIGURE 8.

The lens assembly denoted by numeral 42 and clearly seen in FIGURES 8–10 is mounted on a base member 43 which, in turn, is mounted to the outside of the horn body 41 of the transducer 21. The base member 43 is of a rectangular configuration and has a circular opening 44 extending therethrough with a substantial portion of this opening being of increased diameter at 45, to present an inwardly directed annular flange portion at the bottom of the plate. The diameter at 45 is slightly larger than the outer diameter of the horn body 41 so that the base member 43 may be readily received on the transducer with the transducer abutting the annular flange. The transducer and base member are then maintained in the assembed position by screw 46 which is received in the transducer. In this assembled position, the generally conical shaped portion 41′ of the transducer may project as shown through the opening 44 to form an annular path for the sonic wave transmission in cooperation with the tapered inner surface of body 41.

As also seen in FIGURES 8–10, the lens comprises a pair of opposing identical lens segments each having a primary or mounting vane. The primary vane in the right hand segment is denoted by the numeral 47, with numeral 47′ indicating the primary vane in the left hand segment. Since both of these segments, in the preferred embodiment, are formed in an identical fashion, reference is directed to the right half of the total lens, only, for such reference will also describe the left half of the lens.

The primary vane 47 is formed of stainless steel or other suitable substantially rigid material and high reflectivity for sonic waves and is conveniently of a thickness so that it may properly support the remainder of the plates or vanes in the array.

Each segment further comprises a second and third lens plate or vane indicated by the numerals 48 and 49, respectively. Although further plates may be added, the preferred compact construction involves the small number of plates shown. Whether further plates are added, or not, a substantial open elongated central area is to be maintained between the segments to maintain a substantially narrower beam width along the road and to provide an area of low or minimal attenuation of sonic beam transmission. From this area toward the supporting vane members 47, 47′, the sonic beam will be attenuated and it has been found that the lens in the preferred embodiment attenuates the beam pattern developed by a transducer without a lens by about 20%.

The plates 48 and 49 are also formed of stainless steel or other suitable rigid material of inherently high reflective capability for sonic waves and are mounted on the supporting vane 47 so as to present a rigid structure. The term "rigid" is meant to encompass plates which will be substantially invariable in their shape, size and relative positioning in the total lens under the application of forces being exerted by the sonic waves.

In the preferred embodiment, all of the vanes in each segment of the total lens are mounted in parallel relation to one another and at an angle of about 60° from the horizontal as determined by the bottom of base member 43. This angle is shown in FIGURE 10 and as also seen in the figure, the parallel vanes in each segment are directed inwardly toward the longitudinal axis.

The three parallel vanes in each segment are further situated so that each vane is separated substantially from the immediately adjacent vane. For the preferred assembly shown, for 19 kc., this separation distance may approximate 0.328″ which is approximately one-half wave length.

The minimum depth of the vane assembly, as illustrated at C in FIG. 10, is preferably greater than one-half wave length.

Although the preferred detector operating frequency is set at 19 kc., there is some shift to either side of the preferred frequency due to the Doppler effect of moving vehicles on the transmitted sound beam carrier.

Referring now to FIGURES 9 and 10, the vanes 47–49 are shown to be of equal length and extended so that they are at least as long as the greatest diameter of the cylindrical opening 44 in the mounting base member 43. Although all of the vanes are of the same extended length, the vanes are of varying width, for several reasons. One reason is that, at the particular angle which the vanes in each segment are mounted and when viewing the lens assembly from the front and along the longitudinal axis of transmission of the assembly, there will be a slight overlapping of adjacent vanes so that the portion of the cylindrical opening over which the segments extend will be obscured from view. Therefore, a large portion of the sonic waves which emanate from the diaphragm 27 within the annular horn 25 will be diverted by the vanes toward a reduced total opening or mouth of the assembly to thereupon diverge in a widened beam pattern in front of the lens assembly.

A second and equally important reason for these vanes being of varying width will be apparent when noting FIGURE 10. In this figure, it is seen that when all the vanes in each segment are mounted so as to be in parallel relationship to one another, the sides of the individual vanes terminate on the substantially cylindrical surfaces indicated by the arcs 50, 51 and as stated earlier, the lens will thereby be of a substantially concave or biconcave configuration which causes a sonic wave to diverge outwardly from the lens during transmission.

In one preferred embodiment, a radius of approximately 2.28 inches has been found satisfactory for each of the arcs 50, 51, the radius of the inner arc 50 being from a cylindrical axis approximately in the plane of the diaphragm 27 and the radius of the arc 51 being from a parallel cylindrical axis intersecting the central axis of transmission of the lens and transducer.

Also in one preferred embodiment the following additional dimensions have been found satisfactory, with a transducer of the general type illustrated.

The front opening between the outer (forward) edges of the outer vanes 47 and 47′ may be approximately 1¾ inches, and the central spacing between the outer edges of inner vanes 49 and 49′ may be approximately 9/16 inch.

The base member 43 may have an outer length of about four inches on each side, and an inner diameter at 45 of slightly over 3⅛ inches, with a depth of the narrower cylindrical surface at 44 of approximately 0.093 inch. The vanes may have a length of about four inches and a thickness of about 0.037 inch in stainless steel, with supporting vanes 47 and 47′ of about 1.375 inches wide along the longer sloping part, and with intermediate vanes 48 about 0.875 inch wide and inner vanes about 0.625 inch wide.

Although stainless steel vanes are preferred, it has been found that plastic vanes of "Boltaron" Series 6000 of a thickness of approximately 0.047 inch for vanes 48, 48' and 49, 49' for example have also been found to provide substantially the same desired pattern, but with a very slight loss in amplitude of the transmitted waves.

To mount the lens segments, a portion of each of the supporting vanes 47, 47', along its longitudinal extent, is bent such that the vane presents an internal angle of 120° to the preferred angle of 60° as previously described with respect to the face of the base member 43. This bent portion or foot is indicated by the numeral 52, and carries a plurality of holes which receive a plurality of screws or rivets 53 so that the individual supporting vanes, 47, 47' are mounted in cantilever fashion on the base member 43. When so mounted, these supporting vanes extend inwardly toward the axis of the lens assembly and define an angle of 60° with the base member 43.

The additional vanes 48, 49 are directly mounted on the supporting vane 47 by means of a pair of bolts 54 that pass through the supporting vane at points near the longitudinal ends and adjacent the side opposed from the foot portion 52. Separating adjacent individual vanes are shouldered washers or spacers of resilient vibration absorbent material such as "Teflon," these spacers being indicated by the numerals 55 and 56 in FIGURES 8–10. The spacers or bushing between each pair of vanes, position the individual vanes in parallel relationship and at the desired spaced distances, and also center the bolts to shield the bolt from the vane. External washers 81, 82, at least one of which is preferably shouldered, to seat partly in the vane, are also of vibration absorbent material such as "Teflon" to buffer the vanes from the bolts. The spacers also serve as buffers between the individual vanes 47, 48, 49 to damp internal standing waves in the vanes and to damp transmission of vibrations from one vane to another.

Once the vanes 47–49 are received on the bolt 54 and spaced by the spacers, the unit is secured by the nuts 57. As is well known, lock washers, elastic stop nuts and the like may be employed to provide a secure assembly. Rivets may be used in place of the bolts, nuts and lock washers if desired.

Referring again to FIGURE 10, it should be noted that the sides of the vanes 48, 49 nearest the transducer, terminate at distances denoted by A and B. As brought out above, the edges of all the vanes nearest the transducer lie substantially on the surface of a cylinder having a radius measured from an axis near the plane of the diaphragm of the transducer and perpendicular to and intersecting the longitudinal axis of the lens and transducer and therefore, these distances will be dependent upon the particular radius of the surface. In the preferred embodiment, the distances A, B and C are respectively 9/16", 13/32", and 17/32" for example.

FIGURES 11 and 12 are polar diagrams of a beam pattern 60 obtained by using the lens of this invention and a beam pattern 70 obtained without using the lens, respectively. The beam pattern 60 is the beam developed across the roadway or transverse to the path or line of traffic.

With reference to FIGURES 8 and 10, it is to be pointed out that traffic flow is in a direction perpendicular to the plane of the figures. To locate the lens in the desired position, a decal or other suitable notation may be affixed to the housing, with such notation indicating the line of traffic flow. The proper positioning may be attained by rotating the grooved neck 18 of the housing about the vertical axis before the neck is secured in position by tightening its connection to the collar 13.

A comparison of the beam patterns of FIGURES 11 and 12 will readily show the improved results derived by the lens of this invention. The beam pattern of FIGURE 11, directed across the roadway, is shown as being of approximately twice the width as the pattern of FIGURE 12. Therefore, the zone of detection is greatly increased by using the lens and it is possible to detect vehicle traffic along a highway having two adjacent lanes rather than a single lane. Further, the pattern of FIGURE 11 has no side lobes, such as the lobes 71 in FIGURE 12, and therefore detection may be accomplished throughout the enlarged zone without the fear of portions of this area being "blacked out" by the null 72, which has a very low energy level.

To provide for the direct comparison of the beam patterns, the beam in FIGURE 11 has been increased in amplitude by about 25% since the lens attenuates the beam amplitude by a factor of about 20%.

Although the beam pattern shown in FIGURE 12 is described as the beam pattern developed by a transducer without a lens, the pattern also approximates the beam pattern developed along the roadway when using the lens of this invention. With reference to FIGURES 8–10 and noting the direction of traffic, as discussed above, the beam along the roadway emanates from the area of the diaphragm 27 and horn 25 between the lens segments so as not to be affected by the lens. Even though the beam along the roadway may have the side lobes, these are minor as compared to the relatively narrow main beams and the monitoring or detection of vehicles in traffic is essentially carried out by the main beam which is narrow in the direction of traffic flow, as desired to separately detect successive, closely following vehicles, but the beam being wider transverse to the direction of traffic flow for multi-lane detection, or for improved control of detection in a single lane separately from an adjacent lane where desired, the oval beam pattern with smooth transverse edges, provided by the structure according to the invention, permitted control of the width of the detection zone by adjustment of overall sensitivity of the detection system by well known methods.

From the preceding description, it should be apparent that the lens of this invention provides optimum results, that is, it provides a relatively wide yet highly directional beam with substantially no side lobes for vehicle detection within an enlarged traffic zone of interest, which zone may comprise a pair of parallel lanes, or a single lane.

While the wave directive assembly of two sets of slanted vanes as above described and illustrated, has been referred to primarily as a lens, and it is believed that there is a substantial lens action by the diversion of the sonic waves to progressively longer paths from the inner to the outer vanes, and the spaces between the vanes can in such sense be considered ducts of varying length for the sonic waves in air along the path of transmission of the waves, it has also been found, in contrast with what might be expected in an acoustic lens, that the provision of the central open space between the two sets of vanes is important to obtain the desired distribution characteristic for the beam of sonic wave energy as described above and thus there may be other explanations of the overall effect of applicant's novel combination, from some constriction of the width of the wave front of the wave energy in the transverse direction, or otherwise, which may not be fully understood. Therefore, although the term "lens" has been used for convenience, it is intended not that the invention be limited thereto, but that the assembly be considered more broadly as a wave directive assembly.

Although the alternate use of somewhat thicker plastic vanes has been mentioned above as a possibility in place of the preferred stainless steel vanes, and it is likely that a somewhat thicker set of outer vanes 47, 47' could be made of Boltaron 6,000 series for example, further alternate construction might be obtained from the use of "Teflon" T.F.E. (tetrafluoro ethylene) for individual vanes or for a completely molded assembly of vanes, spacers and base member.

Also although the sonic wave directive assembly has been described primarily in connection with an ultrasonic detector of vehicles, it will be appreciated that such sonic wave directive assembly may have broader application where an oval shaped beam pattern is desired for high frequency sonic waves.

Thus a preferred embodiment of the invention has been shown and described, certain alternate forms have been described or mentioned herein but it will be understood that various other changes in the shape, size and arrangement of parts or in the materials thereof may be resorted to without departing from the spirit of the invention or the scope of the subjoined claims.

We claim:

1. A sonic wave directive assembly for use with an electroacoustic transducer of the type which utilizes a horn loaded diaphragm for transmission or reception of a generally divergent sonic beam pattern, said assembly having an inner face for coupling to the transducer and having an opposite outer face, said assembly comprising:

first and second members disposed on opposite sides of and substantially equally spaced from the longitudinal axis of said assembly, said longitudinal axis being in the plane of and perpendicular to the central wave transmission axis of said assembly, said members being of substantially matching and complementary configuration, said first and second members each including a plurality of spaced substantially flat vanes having elongated inner and outer edges and intervening surfaces of high reflectivity for sonic waves, said respective vanes having progressively greater width of surface between said edges from the vanes nearest said longitudinal axis to the outermost vanes farthest from the longitudinal axis, means for supporting the vanes in each member with corresponding vanes in the respective members at substantially equal and opposite angles with respect to said transmission axis so that the plane of each vane of said first member intersects the plane of the corresponding vane in said second member substantially at a point on said transmission axis, said supporting means supporting the vanes of said first member in substantially parallel planes and the vanes of said second member in substantially parallel planes, said supporting means positioning said vanes so that corresponding edges of the vanes of one face of said assembly define a substantially cylindrical surface concave to the assembly, the cylindrical surface having an axis parallel to said longitudinal axis and to said corresponding edges, and means for mounting said first and second members in predetermined said spaced relationship, leaving an elongated open space of substantial width between said members for sonic wave transmission.

2. The sonic wave directive assembly of claim 1 wherein the inner and outer edges of said vanes of said first and second members define a substantially cylindrical biconcave lens.

3. The sonic wave directive assembly of claim 1 wherein the perpendicular distance between adjacent vanes of said parallel spaced vanes is of the order of one-half wave length of the ultrasonic waves.

4. The sonic wave directive assembly of claim 1 wherein said means for supporting the vanes in each member include a pair of fasteners and a plurality of spacing members of sonic wave absorbent material for spacing the vanes and damping internal vibrations between adjacent vanes.

5. A sonic wave directive assembly as in claim 1 and in which the width of said vanes in relation to the spacing between vanes is sufficient to provide a slight overlap between the inner edges of the vanes and the outer edges of the next adjacent vane outward therefrom.

6. A sonic wave directive assembly as in claim 1 and in which said supporting means includes sideward extensions of the outermost vanes of the respective said members, and means for supporting the remaining vanes of each said member on the outermost vane thereof, and said mounting means including a base member and means for attaching said extensions of said outermost vanes to said base member.

7. A sonic head assembly comprising an electrosonic transducer having an annular horn loaded ring diaphragm, first and second sets of spaced plural substantially flat vanes, said vanes being of relatively narrow width and relatively elongated length, means for mounting the vanes in each set in substantially parallel planes within the set with said vanes being aligned in their elongated direction in one direction transverse to the central transmission axis of said assembly and with said vanes slanted in their narrow direction at substantially corresponding angles outward from said transducer toward said central transmission axis in predetermined buffered spaced relation within said set and in predetermined spaced relation between said sets at substantially symmetrical spacing with respect to said central axis leaving an elongated opening of substantial width between said sets, and means for coupling said sets of vanes to said transducer for transmission or reception of sonic waves in a beam divergent outwardly in an elliptical pattern with its short axis in the elongated direction of said vanes and its long axis transverse thereto.

8. An ultrasonic detector for detection of vehicles by the transmission and reflection of ultrasonic waves in a detection zone covering one or more adjacent traffic lanes, including a sonic head assembly as in claim 7, and including means for mounting said sonic head assembly with said elongated direction of said vanes parallel to the path of traffic along said lane or lanes whereby said elliptical pattern will have its long axis transverse to said lane or lanes and its short axis along said lane or lanes.

9. An ultrasonic detector for detection of vehicles in a detection zone defined by one or more adjacent traffic lanes by the transmission and reflection of ultrasonic waves, said detector comprising an electroacoustic transducer having a narrow divergent beam pattern for transmission or reception of ultrasonic waves, a substantially cylindrical divergent acoustical lens having an open central portion and having a widely divergent beam pattern in one direction transverse to its cylindrical axis and a narrow beam pattern substantially parallel to its cylindrical axis, means coupling said lens to said transducer so that the lens lies in front of said transducer in the beam pattern of the transducer to provide a more widely divergent pattern across said zone and a relatively narrow divergent beam pattern along said zone, a housing for enclosing and supporting said lens and transducer, and means to mount said transducer within said housing.

10. A detector as in claim 9 wherein the cylindrical axis of said lens is parallel to said traffic lanes.

11. A detector as in claim 9 wherein said transducer comprises, an annular ring diaphragm, magnetic means for providing a magnetic field linking said diaphragm, a coil coupled to said diaphragm in said magnetic field to vibrate said diaphragm to produce outgoing ultrasonic waves in response to electrical wave energy applied to said coil and to develop electrical wave energy in said coil in response to mechanical vibration of said diaphragm by incoming ultrasonic waves, and a symmetrical annular horn structure having a central dome-like projecting member and a ring surrounding but spaced from said central member, said ring and said central member having cooperating exponentially tapered surfaces providing a narrow annular inner throat part adjacent said annular diaphragm and a progressively outward expanding throat part in annular form cooperating with said annular diaphragm.

12. A detector as in claim 9 and wherein said lens comprises first and second lens members disposed on opposite sides of and substantially symmetrically spaced from the longitudinal axis of said lens, said members being of substantially matching and complementary configuration, said first and second members each including a plurality of spaced substantially flat vanes, means for supporting the vanes in the respective members in respective sets of substantially parallel planes at outwardly centrally directed angles so that the plane of each vane of said first lens member intersects the plane of the corresponding vane in said second lens member at a point on the longitudinal axis of said lens and in front thereof, means for mounting said first and second members in operative relationship with said members in predetermined spaced relation to and with the front of said lens facing away from said transducer and in the beam pattern of the latter.

13. A detector as in claim 12 and wherein the inner edges of the vanes of said first and second lens members terminate on a cylindrical surface extending outward toward the central axis of transmission.

14. A detector as in claim 12 and wherein the inner and outer edges of said vanes of said first and second lens members define a substantially cylindrical biconcave lens.

15. A detector as in claim 12 and wherein the perpendicular distance between adjacent vanes of said parallel spaced vanes is of the order of one-half wave length of the ultrasonic waves.

16. A sonic wave directive assembly for use with an electroacoustic transducer of the type which utilizes a horn loaded diaphragm for transmission or reception of a generally divergent sonic beam pattern, said assembly having an inner face for coupling to the transducer and having an opposite outer face, said assembly comprising:

first and second members disposed on opposite sides of and substantially equally spaced from the longitudinal axis of said assembly, said longitudinal axis being in the plane of and perpendicular to the central wave transmission axis of said assembly, said members being of substantially matching and complementary configuration, said first and second members each including a plurality of spaced substantially flat vanes having elongated inner and outer edges and intervening surfaces of high reflectivity for sonic waves, means for supporting the vanes in each member with corresponding vanes in the respective members at substantially equal and opposite angles with respect to said transmission axis so that the plane of each vane of said first member intersects the plane of the corresponding vane in said second member substantially at a point on said transmission axis, said supporting means supporting the vanes of said first member in substantially parallel planes and the vanes of said second member in substantially parallel planes, said supporting means including sideward extensions of the outermost vanes of the respective said members with respect to said axis, and means including a plurality of spacing devices of sonic wave damping material for supporting the remaining vanes of each of said first and second members on the outermost vane thereof, and mounting means for said first and second members, said mounting means including a base member and means for attaching said extensions of said outermost vanes to said base member.

References Cited

UNITED STATES PATENTS

| | | | |
|---|---|---|---|
| 1,865,735 | 7/1932 | Wolff | 181—31 |
| 2,750,245 | 6/1956 | MacIntyre | 181—31 |
| 3,046,544 | 7/1962 | Auer | 340—388 |
| 3,086,196 | 4/1963 | Vande Sande | 340—38 |

OTHER REFERENCES

Lafayette Radio Electronics Corp., catalog 610, page 45, copyrighted 1960.

THOMAS B. HABECKER, *Primary Examiner.*